United States Patent [19]

Bekedam

[11] Patent Number: 5,405,435
[45] Date of Patent: Apr. 11, 1995

[54] DEAERATOR UNIT WITH GRAVITY CIRCULATION

[76] Inventor: Martin Bekedam, 19059 N. 88th Ave., Westbrook Village, Peoria, Ariz. 85382

[21] Appl. No.: 205,036

[22] Filed: Mar. 1, 1994

[51] Int. Cl.⁶ .............................................. B01D 19/00
[52] U.S. Cl. ..................................... 96/158; 96/173; 96/174; 96/181; 96/200; 96/203; 261/DIG. 32
[58] Field of Search .................. 96/158, 172, 173, 174, 96/181, 200, 203; 261/DIG. 32

[56] References Cited

U.S. PATENT DOCUMENTS

| | | | |
|---|---|---|---|
| 1,742,998 | 1/1930 | McDermet | 96/203 |
| 1,790,911 | 2/1931 | Gibson | 96/158 |
| 2,671,524 | 3/1954 | Gilwood | 96/158 |
| 2,677,433 | 5/1954 | Kretzschmar | 183/2.5 |
| 2,689,018 | 9/1954 | Kittredge | 96/203 |
| 2,872,999 | 2/1959 | Spining | 188/2.5 |
| 3,291,105 | 12/1966 | Stenard | 96/174 |
| 3,338,033 | 8/1967 | Ross | 96/173 |
| 3,342,020 | 9/1967 | Ross | 96/203 |
| 3,487,611 | 1/1970 | Bekedam | 55/166 |
| 3,555,783 | 1/1971 | Grinshaw | 96/181 |
| 3,802,672 | 4/1974 | Rosenbald | 261/DIG. 32 |
| 3,834,133 | 9/1974 | Bow | 55/257 |
| 3,892,548 | 7/1975 | Gardey | 96/200 |
| 3,932,150 | 1/1976 | Komai et al. | 96/200 |
| 4,698,076 | 10/1987 | Bekedam | 55/164 |
| 4,874,406 | 10/1989 | Bekedam | 55/198 |
| 5,310,417 | 5/1994 | Bekedam | 96/157 |

Primary Examiner—Tim Miles
Attorney, Agent, or Firm—Bielen, Peterson & Lampe

[57] ABSTRACT

An economical deaerator unit for use in boiler feedwater systems for eliminating non-condensible gases, the unit having a containment vessel with a divided internal chamber with an upper scrubbing section and a lower heating and deaerating section with gases flowing from the lower section to the upper section for venting, and with water flowing from the upper section to the lower section for supply to a boiler system with water circulation in the deaerator unit being accomplished by gravity without a transfer pump.

15 Claims, 2 Drawing Sheets

DEAERATOR UNIT WITH GRAVITY CIRCULATION

BACKGROUND OF THE INVENTION

This invention relates to an economical deaerator unit for use in a boiler feedwater system for eliminating non-condensible gases from the boiler feedwater. Non-condensible gases are principally carried into the feedwater system by the addition of makeup water to compensate for losses during the steam cycle. Additionally, gases can be generated in the steam circuit, such as carbon dioxide, which is generated from carbonate salts reacting with metallic components in the steam circuit.

Generally, deaerators are rated as either 0.03 cc/liter or 0.005 cc/liter deaerators, the latter being the most effective in removing dissolved gases. In general, to achieve a reduction of dissolved air and gases to 0.005 cc/liter, the deaerator must operate in a pressurized circuit. The deaerator of this invention provides an alternate solution for the problem of obtaining a high performance deaerator that is either vented to atmosphere or pressurized. Atmospheric deaerators are preferred for their safety features and their low cost in maintaining vessels at low temperatures and pressures. Pressurized deaerators are preferred for their efficiency where maximum deaeration or added capacity is required.

It is an object of this invention to simplify construction of a deaerator unit without sacrifice of performance.

It is also an object of this invention to construct a vertically arranged deaerating system that provides for multiple effect dearation in a divided vessel deaerator unit without the use of a circulating pump.

It is a further object of this invention to construct a deaerator unit having a common design that can be adapted to an efficient atmospheric deaerator unit or an efficient pressurized deaerator unit where the design produces a compact inexpensive unit.

SUMMARY OF THE INVENTION

The deaerator unit of this invention is a compact unit that has a divided deaerator vessel that operates with an upper section and a lower section without the use of a transfer pump. The unit is alternately of an atmospheric type or a pressurized type.

The design of the deaerator unit is such that steam enters the lower deaeration section in a heating and scrubbing unit for a first pass at deaerating water transferred from the upper scrubbing section through an overflow pipe. Injected underwater in the deaeration section, uncondensed steam and any purged, non-condensible gases rise to the upper zone of the deaeration section and pass through a transfer pipe to percolate from a sparge pipe submerged in the scrubbing section for a second pass at scrubbing. Before venting, gases must pass through a conical spray of an internal vent condenser where any remaining steam or water vapor is stripped from the non-condensible gases before the latter are vented from the unit.

Circulation of water is accomplished without a transfer pump in the deaerator unit by use of the circulation system of the boiler feedwater and return. Boiler supply water is drawn from the lower level of the deaeration section of the deaerator unit by an external supply pump and passed to the boilers. Pumped return condensate and any additional makeup water is sprayed into the scrubbing section of the deaerator unit through the spray nozzle in the internal vent condenser. Condensate from the boiler system returned by gravity is also added to the water of the scrubbing section. The accumulated return water results in a spill over into an overflow stand pipe that transfers excess water to the dearation section.

The arrangement as noted can be designed to operate as an atmospheric deaerator unit, or, with an appropriate gas metering vent, as a pressurized deaerator unit. The simplicity in construction and vertical orientation of the cylindrical containment vessel provide economies in cost and space. These and other features will become apparent from a consideration of the Detailed Description of the Preferred Embodiments that follows.

DETAILED DESCRIPTION OF THE PREFERRED EMBODIMENTS

Figure 1:
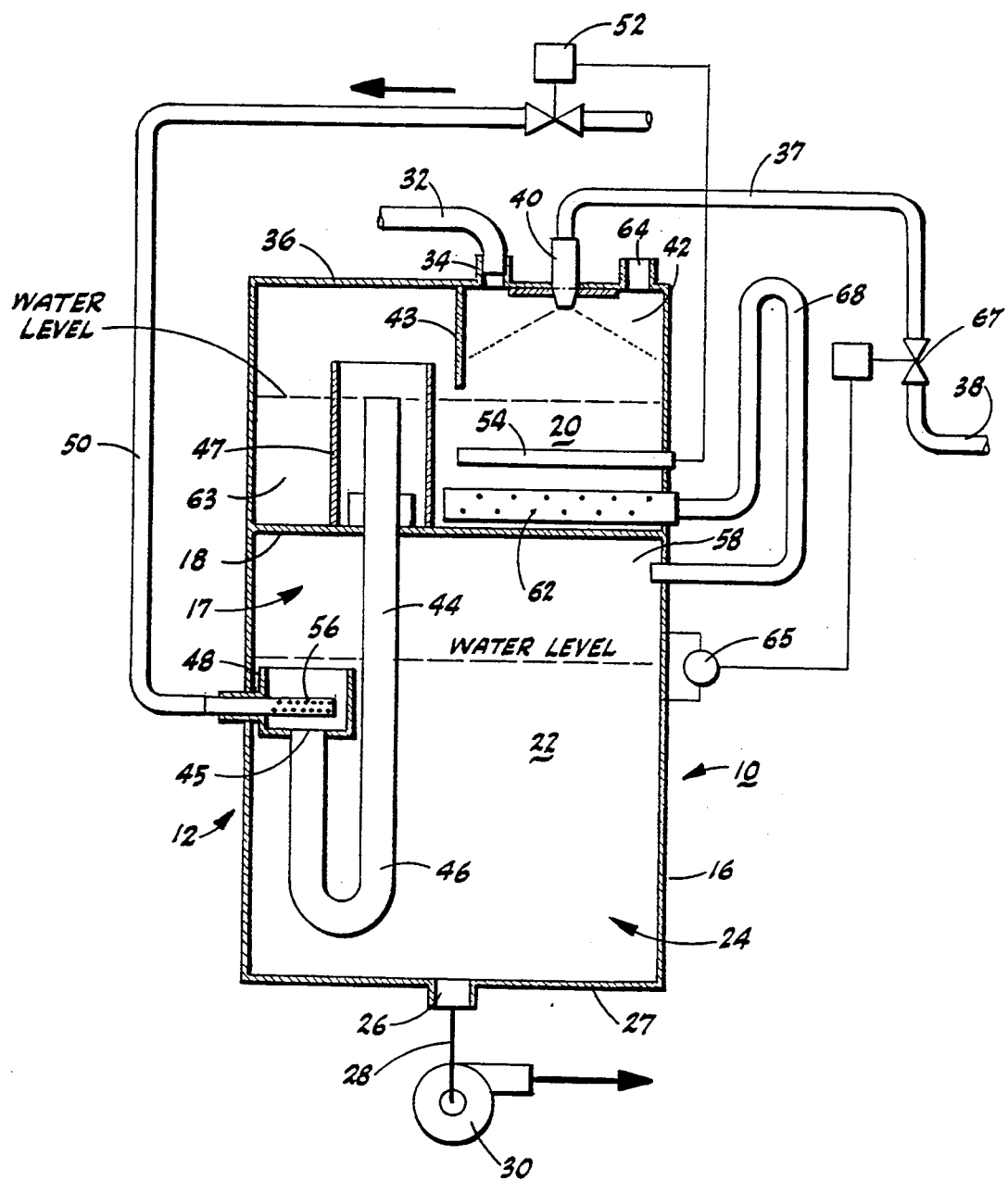
FIG. 1 is a cross sectional view, partially in schematic, of an atmospheric deaerator unit.

The deaerator system of this invention is shown in the drawings and designated, in general, by the reference numeral 10. The atmospheric deaerator unit 12 of FIG. 1 is constructed substantially the same as the pressurized deaerator unit 14 of FIG. 2. Common elements of each unit are identified by the same reference numeral in the figures and perform the same function or operation.

Referring to FIG. 1, the atmospheric deaerator unit 12 is constructed with a vertically oriented cylindrical containment vessel 16, with an internal chamber 17 divided by a horizontal divider 18. The internal divider 18 divides the internal chamber 17 of the vessel into an upper scrubbing section 20 and a lower heating and primary deaerating section 22. Boiler feedwater is contained and deaerated in both sections. The boiler feedwater is supplied to a boiler system (not shown) from the lower zone 24 of the deaerating section 22 through a feedwater outlet fitting 26 on the underside panel 27 of the deaerator unit 10. The outlet fitting 26 connects to an external feedwater line 28 and feedwater supply pump 30. Return condensate from the boiler system is returned to the upper scrubbing section 20 through a gravity return line 32 connected to a condensate return fitting 34 on the top panel 36 of the deaerator unit 12. Pumped return water under pressure in a return line 37 is mixed with makeup water from a water source line 38 to maintain a conical spray from a spray nozzle 40 in an internal vent condenser 42. The vent condenser 42 has a shield 43, such that the conical spray of the nozzle 40 produces a continuous water spray barrier that gases must penetrate before escaping through the vent 64.

The water level in the upper scrubbing section is maintained constant by an overflow pipe 44, which extends from the upper level of the scrubbing section 22, through the divider 18 to the lower zone 24 of the deaerating section 22. The overflow pipe 44 has a U-shaped water trap segment 46 to prevent gases in the lower section 22 from passing directly to the upper section 20 through the pipe 44.

The overflow pipe 44 is protected by a baffle 47 raised from the divider 18 to circulate lower strata and cooler water into the deaerating and heating section 22. The overflow pipe 44 has an end 45 that terminates underwater in a heating and scrubbing receptacle 48. The heating and scrubbing receptacle temporarily contains the lower temperature overflow water, having a higher dissolved gas content, from the remaining scrubbed and deaerated water in the deaerating section 22 of the unit 12. Superheated steam from the boiler system is supplied to the scrubbing receptacle 48 through a supply line 50. The supply line 50 has a steam control valve 52 electronically regulated by a temperature sensor 54 submerged in the water of the scrubbing section 20. In an atmospheric deaerator unit, water temperature in the scrubbing section is maintained at approximately 210° Fahrenheit. Because the deaerating section is under slight pressure and the water is first to receive the steam released in a dispersive manner through a perforated discharge fitting 56, the water temperature is elevated causing release of any dissolved gases.

Steam that is not condensed by injection into the water in the scrubbing receptacle, rises to an upper zone 58 in the deaerating section 22 and passes through a gas transfer pipe 60 to a horizontally oriented, heating and scrubbing, pipe segment 62 submerged under the water in a lower zone 63 of the scrubbing section 20. The transfer pipe 60 has a vapor seal to prevent water in the upper level passing to the lower level through the transfer pipe. Steam and any non-condensible gases scrubbed from the lower section percolate up through the water in the upper section. Any steam that is not condensed in this second passage through water, together with any water vapor, is stripped from the gases passing through internal vent condenser 42 before reaching the vent 64. In this manner, non-condensible gases are continually removed from the water in both levels of the deaerator unit and are discharged to the atmosphere without the loss of valuable steam and water vapor.

Since the transfer pipe 60 discharges gases into the lower zone 63 of the scrubbing section under a water head, preferably nine inches, the lower deaerating section is maintained in a low pressure condition, about one-third psi, by the entering steam. In this manner, the water in the lower section can be maintained at a higher temperature, and therefore be more effective at purging dissolved gases, than the temperature of the upper section.

The level of the water in the lower section is maintained by a water level control sensor 65 that detects the water level and regulates a make-up water control valve 67 in the water source line 38.

Figure 2:
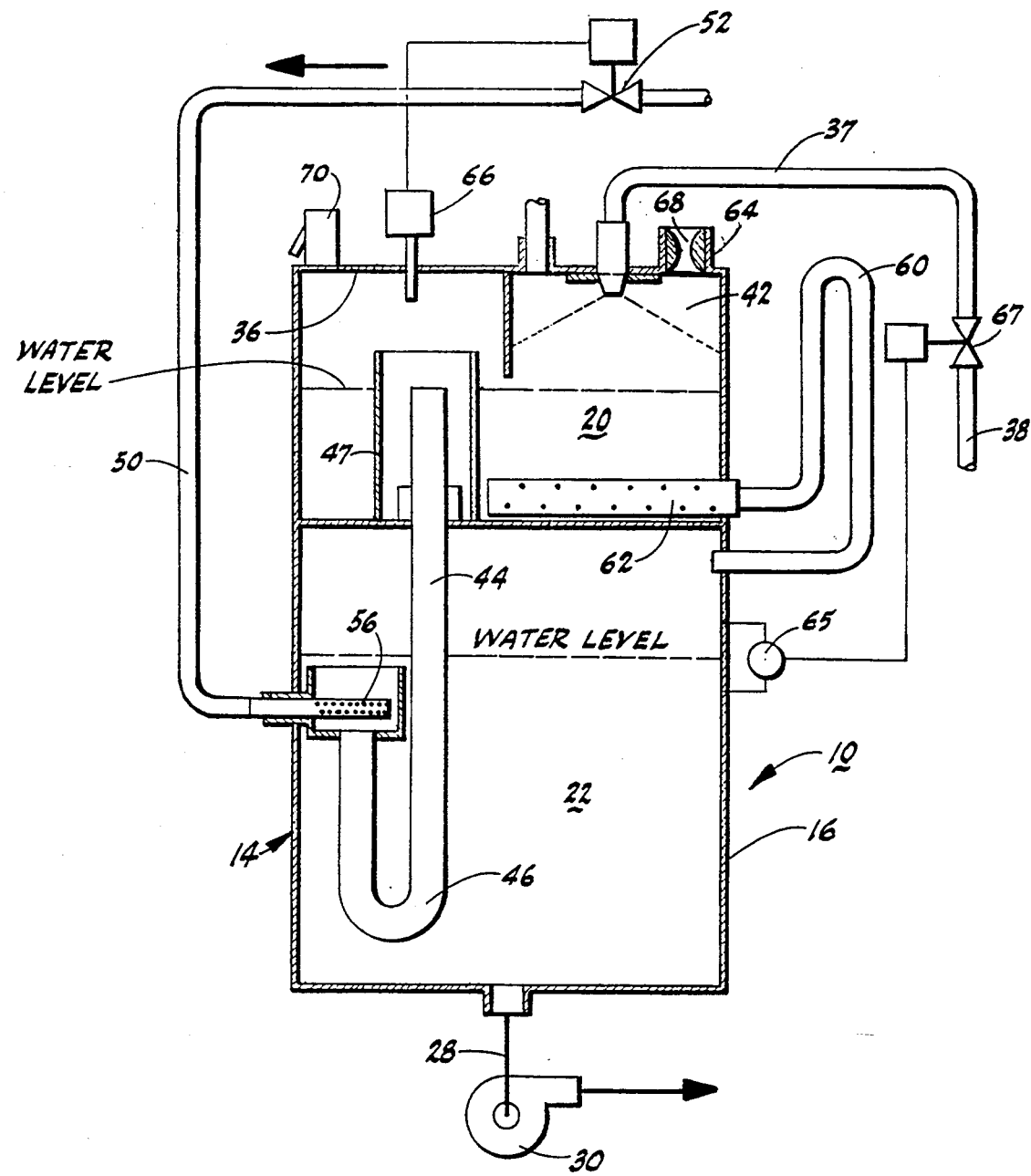
FIG. 2 is a cross sectional view, partially in schematic, of a pressurized deaerator unit.

Referring now to FIG. 2, the deaerator system 10 includes certain modifications to operate as a pressurized deaerator unit. In this mode, the system operates as a triple effect deaerator with additional deaeration occurring in the upper scrubbing section. Operation as a pressurized deaerator unit increases the feedwater handling rate and allows a small compact unit to be used with larger boiler systems.

The construction and operation of the deaerator unit 14 of FIG. 2 is substantially the same as for the unit of FIG. 1. However, the steam control valve 52 is electronically regulated by a pressure sensor 66 in the top panel 36 of the containment vessel 16 for sensing the pressure in the scrubbing section 20. A set pressure, for example, five pounds is maintained by the admission of pressurized steam in the heating and deaerating section 22, and by the metered release of gases through the constricted orifice 68 of the vent 64. A pressure relief valve 70 is included as a safety release if a maximum operating pressure is exceeded.

The deaerator units 12 and 14 provide an inexpensive deaerating system for feedwater in boiler systems, and the alternative atmospheric and pressurized systems allow for a range of operating characteristics at high rating.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is

1. A deaerator unit for a boiler feedwater and return system comprising:

a containment vessel having an internal chamber with a divider wherein the internal chamber of the containment vessel is divided into an upper scrubbing section and a lower deaeration section, each section being partially filled with water during operation;

a vent in the upper scrubbing section having a passage leading to the atmosphere;

a vent condenser communicating with the upper scrubbing section having a spray nozzle constructed to produce a water spray barrier between the upper scrubbing section and the passage of the vent for preventing steam and water vapor from passing through the vent to the atmosphere;

a water supply circuit connected to the spray nozzle for delivering water to the spray nozzle;

a water return line connected to the vessel and communication with the upper section of the chamber for returning water to the scrubbing section from a boiler feedwater and return system connected to the deaerator unit;

a water supply line connected to the vessel and communicating with the lower section of the chamber, for supplying water to the boiler feedwater system;

a steam supply line connected to the vessel and communicating with the lower section of the chamber, the steam supply line including a steam discharge positioned under water in the lower section when the lower section is partially filled with water during operation;

a water overflow pipe communicating between the upper section and the lower section for maintaining a fixed water level in the upper section, the pipe having a water trap segment preventing flow of gases between the upper section and the lower section through the pipe and having an end positioned under water when the lower section is partially filled with water during operation; and a gas transfer pipe communicating between the lower section and the upper section with a pipe segment having an end arranged under water in the upper section when the upper section is partially filled with water during operation and an opposite end arranged above water in the lower section when the lower section is partially filled with water during operation, the transfer pipe having a vapor seal segment between the ends.

2. The deaerator unit of claim 1 wherein the end of the overflow pipe has a submerged receptacle for temporarily containing overflow water from the upper section, wherein the steam discharge is connected with the receptacle for discharge of steam into the water in the receptacle.

3. The deaerator unit of claim 2 wherein the steam discharge comprises a perforated fitting for dispersing steam into the receptacle for heating and deaeration.

4. The deaerator unit of claim 1 wherein the overflow pipe has a standpipe segment in the upper level with an open end and an associated raised baffel member arranged about the standpipe segment, wherein the upper segment has a lower zone and water in the lower zone enters under the baffel member to the open end of the standpipe.

5. The deaerator unit of claim 1 wherein the upper level has a lower zone and the lower level has an upper zone and one end of the gas transfer pipe is arranged in the lower zone of the upper level and the other end of the gas transfer pipe is arranged in the upper zone of the lower level.

6. The deaerator unit of claim 5 wherein the gas transfer pipe has a perforated horizontal segment at the end of the pipe in the lower zone of the upper section.

7. The deaerator unit of claim 1 wherein the water supply circuit includes a water level control sensor located in the lower section, and a water source supply line with a water source control valve connected to the control sensor for adding water when a low operating level is detected by the control sensor.

8. The deaerator unit of claim 1 wherein the steam supply line has a control valve and the deaerator unit has steam control means for operating the control valve for regulating the steam supply to the deaerator unit.

9. The deaerator unit of claim 8 wherein the steam control means comprises a temperature sensor submerged in the water of the upper section when the upper section is partially filled with water.

10. The deaerator unit of claim 8 wherein the steam control means comprises a pressure sensor in the upper section.

11. The deaerator unit of claim 1 wherein the vent has a gas metering means for controlled release of gas through the vent to the atmosphere.

12. The deaerator unit of claim 11 wherein the gas metering means comprises a vent constriction member for constricting the vent passage.

13. The deaerator unit of claim 1 wherein the vent condenser includes a vent shield against which a water spray from the water nozzle is directed.

14. The deaerator unit of claim 1 wherein the vessel is substantially cylindrical in configuration and vertically oriented.

15. The deaerator unit of claim 14 wherein the vessel has a top panel and a bottom panel, wherein the water return circuit is connected to the top panel and the water supply circuit is connected to the bottom panel.

* * * * *